United States Patent Office 3,318,769
Patented May 9, 1967

3,318,769
RESIN COMPOSITIONS COMPRISING ORGANO-PHOSPHORUS PESTICIDES
Frank B. Folckemer, Union, N.J., Robert E. Hanson, Modesto, Calif., and Alexander Miller, Short Hills, N.J., assignors to Shell Oil Company, New York, N.Y., a corporation of Delaware
No Drawing. Filed May 31, 1963, Ser. No. 284,346
6 Claims. (Cl. 167—42)

This application is a continuation-in-part of our copending application Ser. No. 85,445, filed Jan. 31, 1961, and now abandoned.

This invention relates to novel resin compositions. More particularly, it relates to novel resin compositions containing organophosphorus pesticides and to methods for preparing and using such resin compositions.

Dialkyl beta-halogen-substituted vinyl phosphates are now well known as pesticides, particularly as insecticides. These compounds are functional as general poisons on contact, by ingestion or by inhalation. Because of their efficacy, they are widely used as sprays, dusts and baits. While they are generally stable in dry storage, they do hydrolyze when in contact with moisture, and as a consequence must be formulated, stored and used under conditions where their contact with water does not inhibit their utility. They are liquids having relatively high vapor pressures, and thus rapidly dissipate from crops and treated surfaces.

Such phosphates have been conventionally used in solid formulations on inert dusts such as lime, dolomite, gypsum, talc, pumice, diatomaceous earths, kaolins, bentonites attapulgite, and the like. However, because the surfaces of these carriers may be acidic or basic, and because these surfaces sorb moisture, the phosphates are generally not stable on the dusts for long periods and tend to undergo decomposition.

It is an object of this invention to provide novel stable pesticides compositions characterized by enhanced persistence of pesticides. A further object of the invention is the provision of resin compositions of dialkyl beta-halogen-substituted vinyl phosphate pesticides which have superior resistance to hydrolysis. A further object of the invention is the affording of dialkyl beta-halogen-substituted vinyl phosphate pesticide compositions in a dry stable form which lends itself readily to storage and to dispersion in the form of dust, powder, pellets or similar solid shapes. Solid resin compositions of such pesticides which are effective to generate vapors of the pesticides at controlled rates are other objects of the invention. A further object of the invention is the safening of dialkyl beta-halogen-substituted vinyl phosphate pesticides, which have high mammalian toxicity—that is, solid resin compositions of such pesticides provided by the invention release the pesticide at a controlled rate which effectively controls pests, yet reduces the toxicity of the pesticide to persons handling it. Another object is the provision of methods for preparing such compositions, while the use of such compositions against such pests as insects, mites and nematodes is yet another object. Use of certain of such compositions to control internal parasites of warm-blooded animals is claimed in U.S. Patent 3,166,472, issuing from an application copending with this application. Other objects will be apparent from the following description of the invention.

These objects are accomplished in the invention by the resin composition comprising a solid organic macromolecular thermoplastic resin containing up to about 70% by weight of a dialkyl beta-halogen-substituted vinyl phosphate. Such resin compositions are easily prepared, readily stored and handled, and afford stable moisture-resistant formulations whereby the efficacy of the pesticide is retained for extended periods, by controlling the rate at which the pesticide is released from the formulation to the environment surrounding the formulation.

By solid organic macromolecular thermoplastic resin is meant those polymers of thermoplastic character having a molecular weight of preferably above about 1000 and which are solids at room temperature. Exemplary of such materials are the polyolefins, such as polyethylene, polypropylene and copolymers thereof; acrylate ester resins, such as polymethyl acrylate, polyethyl acrylate, polymethyl methacrylate, polyethyl methacrylate, and copolymers thereof; vinyl resins, such as polystyrene; polyvinyl halides such as polyvinyl chloride; polyvinyl acetals such as polyvinyl butyral; polyvinylidene compounds such as polyvinylidene chloride; synthetic and natural elastomers, such as *Hevea brasiliensis*, cis-1,4-polyisoprene, polybutadiene, SBR rubber, and copolymers of such rubbers; cellulose plastics, such as cellulose acetate, cellulose butyrate, cellulose nitrate and the like. Choice of the resin will depend both on the particular pesticides with which it is to be formulated and the conditions under which the final formulation will be employed. The resins, to be most effective, must be insoluble in water and present a hydrophobic surface, thus resisting the sorption of moisture on their surface.

The class of resins with which the dialkyl beta-halogen-substituted vinyl phosphates are most compatible, and which is therefore the preferred class, is that class made up of solid polyvinylic resins, that is, resins whose monomers were polymerized through their vinylic double bond. These resins are typified by the polyvinyl halides, such as polyvinyl chloride and polyvinyl fluoride; the polyacrylate and polymethacrylate esters, such as polymethyl acrylate and polymethyl methacrylate; and the polyvinyl benzenes, such as polystyrene and polymerized vinyl toluene. Because it combines the most desirable physical properties with the most compatibility for dialkyl beta-halogen-substituted vinyl phosphates, the most preferred resin is polyvinyl chloride.

The pesticides contemplated in this invention can be represented by the formula

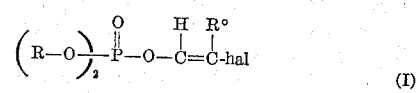

(I)

wherein R represents alkyl of from 1 to 4 carbon atoms, R° is hydrogen or middle halogen and hal is middle halogen, preferably chlorine.

Typical species of these compounds include:

Dimethyl 2,2-dichlorovinyl phosphate;
Diethyl 2-chlorovinyl phosphate;
Dimethyl 2-chlorovinyl phosphate;
Diethyl 2,2-dichlorovinyl phosphate;
Dimethyl 2,2-dibromovinyl phosphate;
Dimethyl 2-bromovinyl phosphate;
Diethyl 2,2-dibromovinyl phosphate;
Diethyl 2-bromovinyl phosphate;

Preferred are those compounds wherein hal and R° are both chlorine.

Resin compositions containing these compounds are effective against mosquitoes, mites, aphids, houseflies, boll weevils and similar pests.

It is an important feature of the invention that the pesticides which have been described are superior plasticizers for polyvinylic resins.

The compositions of the invention are those wherein the pesticide content amounts of from about 0.1 to about 75 percent of the weight of the composition. At least about 0.1 percent of the pesticide is required for effectiveness of the composition, and usually it will be found desirable that the pesticide concentration be at least about 0.5 percent. In general, the limit of solubility of the pesticide in the resin is about 75 percent, with the compositions being wet or gummy when a higher concentration of pesticide is attempted. To insure that the composition is dry, it usually is desirable to limit the concentration of the pesticide below about 70 percent, on the same basis.

The preparation of resinous compositions having the above compositions is achieved by conventional methods. Because of the great compatibility of the dialkyl beta-halogen-substituted vinyl phosphates in the polyvinyl resins, the compositions may be prepared merely by mechanical mixing of the pesticides with powdered resin. When the resulting powder is dry, it may then be used as it stands. Fluid pastes, or "plastisols," can be made which can be molded, extruded, cast, or otherwise formed into such other shapes as sheets, rods, granules, foams and the like. In some cases, the mixture of the pesticide and the resin must be heated, preferably in a closed vessel up to about 100° C. or higher to achieve solidification, or "fusion," of the resin. Alternatively, the pesticide may be incorporated in the resin by milling, by the use of mutual solvents, and by other similar blending methods. Where the prepolymerized resin exists in liquid form, as in the case of such monomers as styrene or methyl methacrylate, the pesticide may be incorporated in the liquid before it is polymerized or cured.

The resulting resin compositions contain the pesticide in solid solution but substantially in chemically unchanged form. The resinous composition itself, however, is dry to the touch, dimensionally stable and may be formed into useful shapes by conventional methods. Thus, a blend of polyvinyl chloride powder containing 30 percent by weight of dimethyl dichlorovinyl phospate mixed therewith may be extruded with simultaneous application of heat, to form strands which may be chopped into desired lengths as extruded to afford solid cylindrical pellets. Alternatively, the resin containing the pesticide may be extruded into sheets which in turn may be cut into strips. Polyvinyl chloride containing 20 percent by weight of dimethyl dichlorovinyl phosphate, in combination with additional plasticizer and a blowing agent, can be made into foams of the material. The resin product can be granulated or powdered, for application by dusting, dissemination into soil, or for like applications. The shape of the resin product desired will be determined by the use to which the composition is to be put.

A major advantage of the resin products which have been described is that such products act as controlled-release generators for the pesticide into the atmosphere surrounding the product. The dialkyl beta-halogen-substituted vinyl phosphates are relatively volatile at ordinary room temperatures. In the vapor phase, they are highly effective against flies and mosquitoes (for example, a concentration of only about 0.03 to 0.04 microgram per liter of dimethyl dichlorovinyl phosphate in air is lethal to mosquitoes). Such pesticides, when used in resin formulations of this invention, evaporate from the surface of the resin into the surrounding atmosphere. As the pesticide so evaporates, additional pesticide migrates from the body of the resin formulation to the surface thereof, thus replacing the evaporated pesticide. Such resin formulations accordingly provide controlled release of the pesticide into the surrounding air for a considerable period of time.

The rate of release of the pesticide from any given mass of the resin into free air at any given time will depend on the temperature of the resin and the air, the concentration of the pesticide in the resin, the amount of free resin surface, and the rate of migration of the pesticide from the body of the resin to the surface, the latter being the rate-controlling step. On the other hand, when kept in sealed containers wherein the atmosphere quickly becomes saturated with pesicide the resin compositions may be stored for extended periods without appreciable decrease in pesticide content.

Vapor pressures of a typical dialkyl beta-halogen-substituted vinyl phosphate, is presented in the following table:

| Ester | Temperature, °C. | Vapor Pressure. mm. Hg. |
|---|---|---|
| Dimethyl-2,2-dichlorovinyl phosphate | 60 | 0.296 |
|  | 32 | 0.032 |

Of the dialkyl beta-halogen-substituted vinyl phosphates, dimethyl esters are the most volatile and for that reason are particularly useful in the resin compositions of the invention used for generation of pesticide in the vapor phase.

In general, when such beta-halovinyl phosphates are dispersed under field conditions, as ducts, sprays or the like, they dissipate at an undesirably rapid rate. Because of this lack of persistence, repeated applications of the pesticide must be employed in order to obtain lasting protection in a given area. When the pesticide is dispersed in the form of a solid prepared from the resin compositions of the invention, however, the persistence of the pesticide is materially extended without risk of hydrolysis of the unevaporated material.

Because of their enhanced persistence and superior resistance to hydrolysis, the resin compositions described may be used for soil and sub-soil applications. In this way, the pesticides may be used against ants, bettles termites, worms and larvae.

In some applications, it may be desirable to dilute or "cut-back" a powdered resin formulation with a conventional solid, particulate carrier material, such as pyrax, or the like. Such is readily accomplished by simply mixing the powdered resin formulation with the powdered carrier to form a homogenous admixture. Any of the solid agricultural nonsorptive carrier materials of low specific surface area can be used.

In order to provide longer persistance with the same degree of plasticizing as effected by higher concentrations of the pesticide, the resin formulations of the invention may be prepared by including in the resin a mixture of the volatile pesticide and a non-pesticidal relatively non-volatile plasticizer, particularly a neutral phosphate ester, the total amount of pesticide and phosphate ester being an amount sufficient to plasticize the resin. No more than about 70 percent by weight of total plasticizer is required, and for best results at least about 5 percent by weight of the pesticide should be used. Suitable pesticidally inert esters which may be used as plasticizer include the triaryl phosphates, such as tricresyl phosphate, triphenyl phosphate, tri(p-tert-butylphenyl) phosphate, tri(biphenylyl)phosphate, o-biphenylyl diphenyl phosphate, and cresyl diphenyl phosphate; the trialkyl phosphates, such as tri-n-butyl phosphate, tri-2-ethyl-hexyl phosphate, tri-n-octyl phosphate and tri-lauryl phosphate; and such mixed phosphates at 2-ethyl-hexyl diphenyl phosphate and the like. These compounds may be generally described by the structure

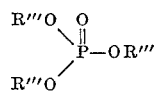

where R''' is a hydrocarbon radical selected from the group consisting of alkyl, aryl, aralkyl and alkaryl preferably having at least four carbon atoms. These esters are virtually non-volatile but impart excellent plasticized properties to the resulting composition. Because of their similar composition, they are readily compatible with the pesticides in the resin compositions.

Other suitable materials, which are effective to plasticize the resin but are comparatively non-volatile and pesticidally inert, include phthalate esters, such as dioctyl phthalate, diphenyl phthalate, dicyclohexyl phthalate, dimethyl phthalate and the dihexyl phthalates; the sebacates, such as dipentyl sebacate, n-butyl benzyl sebacate and dibenzyl sebacate; and the adipates, such as dioctyl adipate, dicapryl adipate, diisobutyl adipate and dinonyl adipate. Other compatible plasticizers, such as the hydrocarbon resinous plasticizers exemplified by hydrogenated polyphenyls and alkylated aromatic hydrocarbons, and polyester plasticizers, e.g., polyesters of such polyols as hexanediol and such polycarboxylic acids as sebacic and adipic acid and having molecular weights of about 2000, many also be used.

Other materials, such as dyes, pigments, lubricants, fillers, antioxidants, ultraviolet stabilizers, and the like, may be included in the resin compositions of the invention without changing the fundamental nature of the invention. For example, it has been found that the stability of the pesticide can be extended if a stabilizing amount, preferably on the order of 0.1 to 10 percent by weight, of a phenol is included in the resin formulation. Such phenols as phenol, p-cresol, m-cresol, hydroquinone, resorcinol and pyrogallol are effective. The preferred class of phenols are the unsubstituted and alkyl-substituted mono- and dihydroxybenzenes, wherein the alkyl groups have up to eight carbon atoms. These compounds tend to stabilize the insecticide in the composition. A particularly useful class of phenols is that represented by phenolic antioxidants. Typical antioxidants include mononuclear hindered phenols such as 2,6-dialkyl phenols, e.g., 2,6-di-tert-butyl-4-methyl phenol; 2,4,6-tri-tert-butyl phenol; 2,6-di-tert-butyl phenol; 2-methyl-6-tert-butyl phenol; 2,4-dimethyl-6 - tert - butyl phenol; 2,6 - diisopropyl - 4-methyl phenol. Also useful are bisphenolic and biphenolic stabilizers, e.g., bis(3,5 - di - tert - butyl - 4 - hydroxyphenyl) methane; bis (2 - hydroxy - 3 - tert-butyl-5-methylphenyl) methane; 3,3',5,5'-tetra-tert-butylbiphenol; and the like. Naphthols, including beta-naphthol, and benzyl alcohols, such as 3,5-di-tert-butyl-5-hydroxybenzyl alcohol; 3,5-diisopropyl-4-hydroxybenzyl alcohol; and 3-methyl-5-tert-butyl-4-hydroxybenzyl alcohol, are also effective stabilizers.

The following examples will illustrate the nature and advantages of the invention. It should be understood, however, that the examples are merely illustrative and are not to be regarded as limitations to the appended claims, since the basic teachings thereof may be varied at will as will be understood by one skilled in the art. Unless otherwise indicated, the proportions set forth in the examples are in parts by weight.

Example I

To samples of powdered polyvinyl chloride (Bakelite QYNV) were added various amounts of dimethyl 2,2-dichlorovinyl phosphate and the mixtures were mechanically mixed for about 15 minutes. At the end of this time, the powders were examined and the following results were obtained.

| Percent by weight of phosphate ester: | Nature of resin |
|---|---|
| 10 | Dry |
| 15 | Dry |
| 20 | Dry |
| 25 | Wet |
| 30 | Paste |
| 35 | Fluid |
| 40 | Fluid |

These results indicated that the resin could absorb up to about 20 percent by weight of the ester without further treatment.

Each of the wet and fluid mixtures was heated to 90°–100° C. for ten minutes. In each case, a firm dry solid was obtained in this manner.

Solvent extraction of the ester from these materials with chloroform showed that the ester was not chemically altered by the treatment and could be recovered unchanged.

Example II

A solid foam was prepared having the following composition:

| | Percent by weight. |
|---|---|
| Polyvinyl chloride | 62.5 |
| Dimethyl 2,2-dichlorovinyl phosphate | 12.5 |
| Tricresyl phosphate | 25.0 |

This foam was hung in a duct through which passed a moving column of room-temperature air and removed at intervals to determine the rate at which the foam was generating the ester in vapor form. The following data were obtained:

| Exposure time, days: | Vaporization rate, micrograms/ cm.$^2$ of foam surface/hour |
|---|---|
| 0 | 32 |
| 7 | 13 |
| 9 | 9 |
| 32 | 8 |
| 51 | 1 |

The foam was generating ester vapor long after an equivalent amount of the ester in liquid form would have evaporated.

Example III

Granules of 9/24-mesh having the following composition were prepared:

| | Percent by wt. |
|---|---|
| Polyvinyl chloride | 70 |
| Dimethyl 2,2-dichlorovinyl phosphate | 30 |

A 15 gram sample of the granules in a dacron mesh bag was hung in a conduit through which passed a moving column of room temperature air. The bag was removed at intervals and the rate of phosphate ester vapor generation determined. The following results were obtained:

TABLE I

| Carrier | Quantity of Granules, grams | Mesh Size | Amount of Insecticide Vaporized (milligrams per hour) | | | | | | | |
|---|---|---|---|---|---|---|---|---|---|---|
| | | | Initially | After Exposure (days) | | | | | | |
| | | | | 7 | 14 | 21 | 28 | 35 | 42 | 56 |
| PVC [1] | 15 | 10/24 | 1.49 | 1.55 | 1.91 | 1.24 | 0.74 | 0.52 | | |
| PVC | 15 | 10/24 | 1.05 | 1.37 | 1.13 | 0.45 | 0.64 | 0.31 | 0.25 | 0.32 |
| PVC | 60 | 10/24 | 1.08 | 1.63 | 1.37 | | | 0.41 | | |
| PVC | 60 | 10/24 | 4.54 | 2.40 | 0.79 | | | | | |
| PVC | 60 | 10/24 | | 2.26 | 1.90 | | | | | |
| PVC | 60 | 24/60 | 2.52 | | 1.26 | | | | | |
| PVC | 60 | 24/60 | | 1.25 | 1.49 | | | | | |
| Pikes Peak, 9H66 [2] | 15 | 20/40 | 1.31 | 0.87 | | 0.24 | | | | |

[1] This bag of granules was lying flat during the vaporization test. All others were suspended in the chamber.
[2] These granules contained 20%, rather than 30% DDVP. The composition was as follows:

| | Percent wt. |
|---|---|
| Pikes Peak 9H66 (0.5% H$_2$O) | 75 |
| DDVP | 20 |
| 2,6-di-tert-butyl-4-methylphenol | 5 |

The resin granules were producing appreciable amounts of vapor long after an equivalent amount of liquid ester would have evaporated.

*Example IV*

The storage stability of dimethyl-2,2-dichlorovinyl phosphate formulated on conventional clays was compared with that of the ester in various resin compositions. The resulting data were obtained:

ON GRANULAR CLAY CARRIERS

| Type of Clay | Water Content of Clay. (Percent w.) | Percent by Weight of Ester | | Percent Decomposition |
|---|---|---|---|---|
| | | Initial | After 2 weeks at 130° F. | |
| Attapulgite | Normal [1] | 18.4 | 5.9 | 68 |
| Montmorillonite | do [1] | 19.1 | 9.3 | 51 |
| Do | 0.5 (specifically dried). | 18.9 | 12.7 | 33 |

[1] The water contents were normal or stored clays, being between 6 and 10 percent by weight.

POLYVINYL CHLORIDE RESIN FORMULATIONS

| Sample | Percent by Weight of Ester | | Percent Decomposition |
|---|---|---|---|
| | Initial | After 2 weeks at 130° F. | |
| 9/24 mesh granules | 27.0 | 25.6 | 5 |
| 24/60 mesh granules | 26.8 | 23.3 | 13 |
| Powder | 28.3 | 15.6 | 15 |
| Foam | 11.3 | 10.5 | 7 |

The results of the accelerated stability tests show that the resin compositions were much more stable than the formulations on clays.

*Example V*

Monomeric methyl methacrylate was thermally polymerized with benzoyl peroxide with 0.1 percent by weight of dimethyl-2,2-dichlorovinyl phosphate in the mixture. The product was a tough dry solid resin. In another preparation monomeric methyl methacrylate containing 0.1 percent by weight was heated on a steam bath until its viscosity had increased markedly. At that point, sufficient dimethyl 2,2-dichlorovinyl phosphate was added to render the mixture 10 percent by weight in the phosphate. The resin was then allowed to polymerize at 50–168° C. until a hard, tough dry resin was obtained. The resin was then mixed with attaclay and dispersing agents and hammer-milled three times. A finely divided resin powder was obtained in this manner.

A solid polystyrene resin containing dimethyl 2,2-dichlorovinyl phosphate was obtained in this manner.

*Example VI*

A solid plastic composition was prepared by mixing resinous Polyol X–450 (a polymerized styrene-allyl alcohol resin) with 3.6 percent by weight of dimethyl 2,2-dichlorovinyl phosphate. From this composition a smooth dry flowable powder was formed.

*Example VII*

A solid plastic composition was prepared by mixing Disacryl resin (polyacrolein) with an equal weight of dimethyl 2,2-dichlorovinyl phosphate. From this mixture a smooth dry flowable powder was formed.

*Example VIII*

Selected resin samples containing dimethyl 2,2-dichlorovinyl phosphate were each hung in a mesh bag in the center of separate substantially square huts having a volume of at least about 500 cubic feet. At the end of specified times, mosquitoes were introduced into the huts for a 30-minute exposure. The knockdown and mortality rates of the mosquitoes at each time in each hut were determined. Resulting data are presented in the following table:

| Sample | Percent Knockdown and Mortality, Percent | | | | |
|---|---|---|---|---|---|
| | 2 Hrs. | 24 Hrs. | 48 Hrs. | 7 Days | 15 Days |
| 24/60 mesh polyvinyl chloride granules, 30% w. 2. DDVP | 100 | 100 | 100 | [1] 100 | 100 |
| | 100 | 100 | 100 | 100 | 100 |
| 9/24 mesh polyvinyl chloride granules, 30% w. DDVP | 100 | 100 | 100 | [2] 100 | 100 |
| | 100 | 100 | 100 | 100 | 70 |

[1] Hut was aired ofr 5 hours at end of 7 days.
[2] Hut was aired for 8 hours at end of 7 days.

*Example IX*

The following resin powder compositions were prepared and their effectiveness evaluated by exposure of the powder in mosquitoes in 8' x 8' x 8' huts. The results obtained are presented in the following table:

RESIDUAL TOXICITY OF RESIN POWDERS TO ADULT *ANOPHELES ALBIMANUS* MOSQUITOES EXPOSED TO DEPOSITS FOR 1 HR.

| Formulation | Dosage, mg./ft.[2] | Surface | Avg. Percent 24 Hr. Mortality at Interval Indicated | | |
|---|---|---|---|---|---|
| | | | Fresh | 1 day | 7 days |
| 25% DDVP-75% Disacryl | 100 | Glass | 100 | 100 | 100 |
| Do | 100 | Plywood | 100 | 100 | 100 |
| Do | 100 | Mud | 100 | 100 | 0 |
| Do | 200 | Mud | 100 | 100 | 0 |
| 7.6% DDVP-15.2% Aroclor 5460 | 100 | Mud | 100 | 100 | 10 |

*Example X*

The purpose of this preparation was to make a granular polyvinyl chloride formulation containing dimethyl 2,2- dichlorovinyl phosphate (DDVP), the materials used were as follows:

```
                                                      Grams
DDVP _____   23
Polyvinyl chloride powder (Bakelite QYNV) _____   77
```

While the powdered polyvinyl chloride resin was being mixed in a small tumbler blender, the DDVP was added as a fine spray. During the tumbling action the resin formed soft beads, coated with powder. After the addition of the toxicant the material was screened through a nine-mesh screen. Those lumps that failed to pass were gently brushed through this screen. The soft beads were spread in a thin layer and heat cured in an oven at 130° C. for three minutes. Fairly hard firm granules resulted. These were mechanically screened into fractions of 9 to 24 mesh and 24 to 60 mesh. About 80-85% of the blend was between 9 and 60 mesh.

*Example XIV*

The purpose of this preparation was to make resin pellets containing polyvinyl chloride resin and dimethyl 2,2-dichlorovinyl phosphate (DDVP). The materials used were:

```
                                                      Grams
Polyvinyl chloride powder (Bakelite QYNV) _____    6
DDVP _____    4
```

A plastisol was formed by mixing the resin and the DDVP. The paste formed was molded into pellets on a pill board. While in the mold, the pellets were gelled by placing the board on a steam bath and heating ten minutes on each side. A final fusion was accomplished by heat curing the gelled pellets in an oven at 130° C. for four minutes. Mechanically stable resin pellets resulted.

*Example XV*

The purpose of this preparation was to make a powder using polyvinyl chloride (PVC) resin as the carrier and dimethyl 2,2-dichlorovinyl phosphate (DDVP) as the toxicant. In order to prepare this powder the following materials were used:

```
                                                      Grams
Polyvinyl chloride (Bakelite QYNV) _____   24
DDVP _____    6
```

The DDVP was added dropwise to the resin while the latter was being constantly agitated. Many small, soft lumps were formed which were broken up by grinding in a mortar and pestle. The powder was then brush-screened through a 40 mesh screen, affording a dry stable powder.

*Example XVI*

The purpose of this preparation was to form a resin material containing dimethyl 2,2-dichlorovinyl phosphate (DDVP) and which would have a large surface area. A polyvinyl chloride (PVC) foam containing DDVP as the plasticizer was prepared to meet these requirements.

The ingredients used in this formualtion are as follows:

```
                                                      Grams
Polyvinyl chloride powder (Bakelite QYNV) _____   20
Tricresyl phosphate _____    8
DDVP _____    4
Freon 11 (trichloromonofluoromethane) _____   12
```

The DDVP and tricresyl phosphate were mixed together and added slowly with agitation to the PVC powder. This plastisol was well mixed to insure good distribution. Following this, the F-11 was added and mixed into the plastisol. The mixture was poured into a petri dish, 9 centimeters in diameter, and placed on a steam bath. At this temperature, the Freon 11 volatilized as the gellation of the plastisol took place. A solid cake resulted that possessed a porous, irregular surface of considerable surface area.

Following the fusion of this porous cake, portions of it were formed into clear films.

*Example XVII*

By techniques involving melting the resin and mixing DDVP therewith, formulations of DDVP with the following resins have been prepared:

(1) Vinsol ester gum (neutral glycol ester of a thermoplastic resin derived from pine wood).
(2) Lewisol 33 (rosin-modified maleate resin).
(3) Piccolastic D-150 (polystyrene resin).
(4) Chlorowax 70 (chlorinated paraffin).
(5) Neville resin R-12, R-12A (coumarone-indene resins).
(6) Aroclor 5460, 2565, 5060 (chlorinated hydrocarbons).
(7) Pentalyn K, N (pentaerythritol esters of rosin).
(8) Piccolyte S-125 (terpene resin).
(9) S. Beckacite 2100 (phenolic-maleic ester resin).
(10) Nevidene (coumarone-indene resin).
(11) Nuba No. 2 (coal tar resin).
(12) 8L ester gum (glycol ester of rosin).
(13) Nebony 100, 80 (coal tar resins).
(14) Paradene No. 1 (paracoumarone-indene resin).
(15) Picco 410L (paracoumarone-indene resin).
(16) Picco 420 (indene resin).
(17) Piccopale 100 (petroleum hydrocarbon resin).
(18) Synthe-Copal ester gum (rosin ester gum).
(19) Alkydol 140 (alkyl resin).
(20) Cellolyn 102 (modified alkyd resin).

*Example XVIII*

That the compositions of the invention are effective in safening insecticides of high mammalian toxicity is demonstrated by the following data, which compares the mammalian toxicity, $LD_{50}$ dosage, milligrams per kilogram of body weight, of the insecticide per se, and the formulation containing it:

| Test Material | $LD_{50}$ | |
| --- | --- | --- |
| | Oral (against rats) | Dermal (against rabbits) |
| Dimethyl 2,2-dichlorovinyl phosphate | 78±10 | 136±14 |
| Dimethyl 2,2-dichlorovinyl phosphate, 20% polyvinyl chloride, 80% | 1,242±366 | [1] >50,000 |

[1] No deaths at any level tested, as high as 50,000 milligrams per kilogram of body weight.

As has been demonstrated in other examples, the effectiveness of the insecticide is not materially affected by inclusion in the resin.

Further forms which compositions of this invention may take, for effective utilization of the insecticide, are demonstrated in the following examples.

*Example XIX*

Extruded flat strips containing 20% w. dimethyl 2,2-dichlorovinyl prosphate (DDVP) were prepared. The liquid was sprayed onto powdered polyvinyl chloride (Geon 101 EP) and heated to 150° F. while mixing. The resulting powder was extruded at a temperature of 320 to 380° F., to give a strip 2.5 inches wide and 0.22 inch thick. The strip was cut into ten-inch lengths, which were used as sources of vapors of DDVP.

One of these strips, suspended in a room having a volume of 830 cubic feet, at a temperature of 100° F. and relative humidity of 70%, gave control of mosquitoes for over three months.

*Example XX*

Extruded strand containing 20% w. dimethyl 2,2-dichlorovinyl phosphate (DDVP) was prepared. The extrusion powder was prepared as in Example XIX. The composition was extruded at a temperature of 300 to 340° F., through a circular die, to give a continuous strand ⅛-inch in diameter. The strand was cut into convenient lengths, to serve as a source of DDVP vapors.

This strand was strung in dairy barns to control flies, using 30 feet of strand for every 100 square feet of floor space. It gave effective control of flies for 12 to 16 weeks.

In some cases, dibutyl phthalate was used as plasticizer, while in others, tri(butyoxyethyl)phosphate was used as plasticizer.

All of the formulations released DDVP to the atmosphere over substantial periods of time.

We claim as our invention:

1. A composition of matter comprising:
  (a) a normally liquid, water-sensitive phosphate relatively volatile at ordinary room temperatures, toxic to mammals and having the formula:

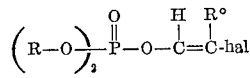

wherein R represents alkyl of from 1 to 4 carbon atoms, hal represents middle halogen, and R° represents a member of the group consisting of hydrogen and middle halogen, and
  (b) a solid, organic, essentially water-insoluble, hydrophobic, thermoplastic resin having a molecular weight above 1000,
said phosphate being in solid solution in said resin,
said composition being characterized by being essentially dry, stable, resistant to moisture, of reduced toxicity to mammals, with a part of the phosphate being present on the surface of said composition and when the composition is in contact with a gaseous or liquid environment, phosphate spontaneously passing from the said surface to said environment, additional phosphate moving from the body of said composition to the surface thereof, replacing phosphate passed from the said surface, said composition accordingly providing sustained, controlled, spontaneous, essentially continuous release of phosphate from the composition to the environment surrounding the composition.

2. A composition of matter comprising:
  (a) dimethyl 2,2-dichlorovinyl phosphate characterized by being, normally liquid, water-sensitive, relatively volatile at ordinary room temperature, and toxic to mammals, and
  (b) polyvinyl chloride resin characterized by being, solid, essentially water-insoluble, hydrophobic and thermoplastic,
said phosphate being in solution in said resin,
said composition being characterized by being essentially dry, stable, resistant to moisture, of reduced toxicity to mammals, with a part of the phosphate being present on the surface of said composition and when the formulation is in contact with a gaseous or aqueous liquid environment, said phosphate spontaneously passing from the said surface to said environment, additional phosphate moving from the body of said composition to the surface thereof, replacing phosphate passed from the said surface, said composition accordingly providing sustained, controlled, spontaneous, essentially continuous release of the phosphate to the environment surrounding the composition.

3. A composition according to claim 1 wherein the phosphate is dimethyl 2,2-dichlorovinyl phosphate and the resin is a polyvinylic resin resulting from a monomer containing a polymerized through a vinylic double bond.

4. The method of killing insects, which comprises subjecting insects to the composition of claim 1.

5. The method of killing insects, which comprises subjecting insects to the formulation of claim 3.

6. The method of killing insects, which comprises subjecting insects to the composition of claim 2.

References Cited by the Examiner

UNITED STATES PATENTS

| 2,630,380 | 3/1953 | Hanson et al. | 167—42 |
|---|---|---|---|
| 2,574,515 | 11/1951 | Walter et al. | 167—22 |
| 2,750,323 | 6/1956 | Schmitz-Hillebrecht et al. | 167—42 |
| 2,777,824 | 1/1957 | Leeds | 260—2.5 |
| 2,956,073 | 10/1960 | Whetstone et al. | 167—22 |
| 2,966,440 | 12/1960 | Gerolt | 167—42 |
| 3,022,261 | 2/1962 | Fields et al. | 167—22 |
| 3,055,297 | 9/1962 | Leeds | 101—327 |
| 3,058,941 | 10/1962 | Birum | 260—30.6 |
| 3,074,845 | 1/1963 | Greary | 167—42 |
| 3,166,472 | 1/1965 | Menn et al. | 167—53 |

FOREIGN PATENTS 903,159   8/1962   Great Britain.

OTHER REFERENCES

Miles et al.: "Agricultural and Food Chemistry," vol. 10, No. 3, May–June 1962.

ALBERT T. MEYERS, *Primary Examiner.*

JULIAN S. LEVITT, SAM ROSEN, LEWIS GOTTS, *Examiners.*

GEORGE A. MENTIS, *Assistant Examiner.*